UNITED STATES PATENT OFFICE.

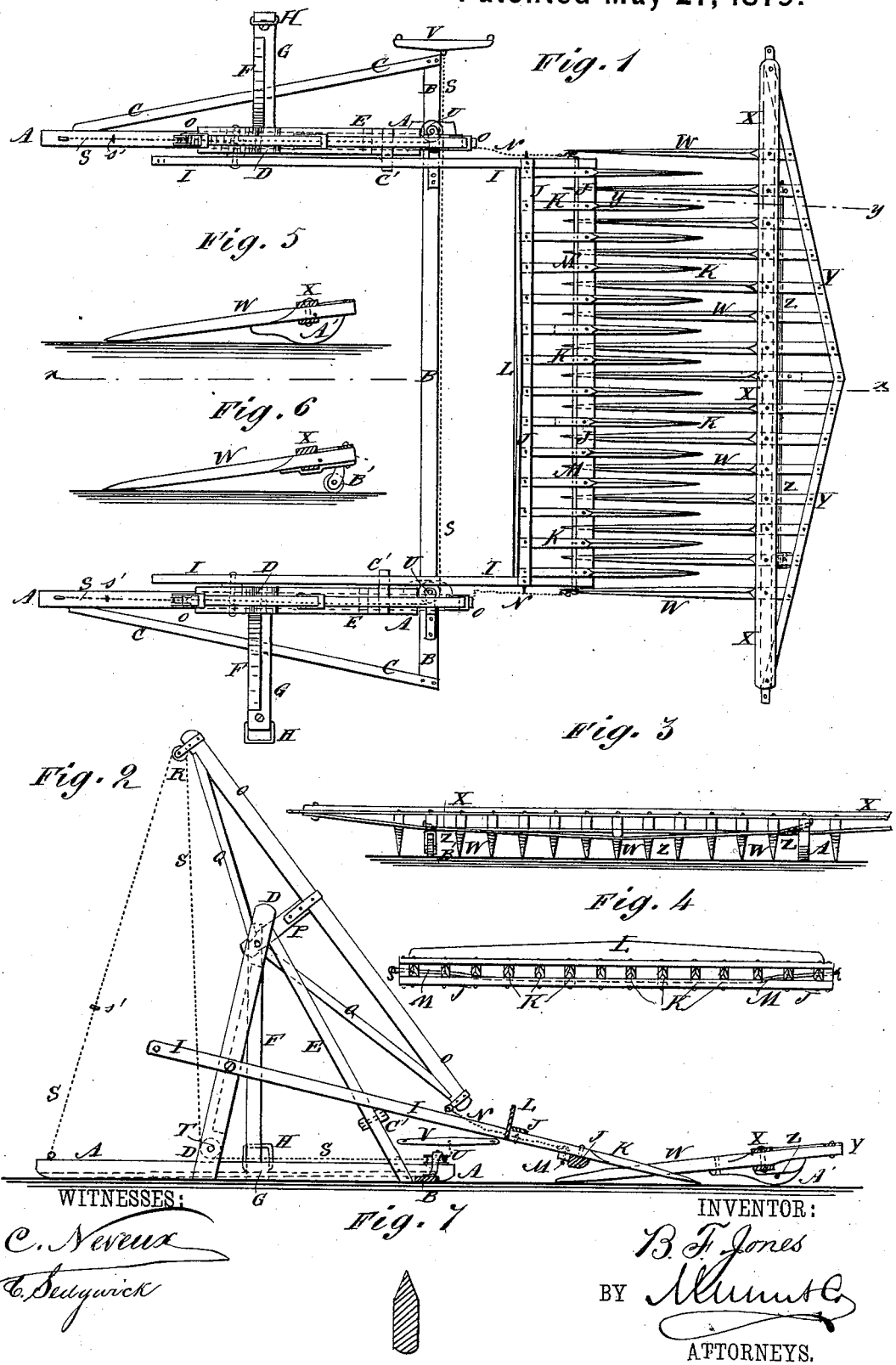

BENJAMIN F. JONES, OF BOONVILLE, MISSOURI.

IMPROVEMENT IN HAY RICKER AND STACKER.

Specification forming part of Letters Patent No. 215,930, dated May 27, 1879; application filed February 24, 1879.

*To all whom it may concern:*

Be it known that I, BENJAMIN FRANKLIN JONES, of Boonville, in the county of Cooper and State of Missouri, have invented a new and useful Improvement in Hay Ricker and Stacker, of which the following is a specification.

Figure 1 is a top view of my improved machine. Fig. 2 is a vertical section of the same, taken through the line $x\,x$, Fig. 1. Fig. 3 is a rear view of the gathering-rake. Fig. 4 is a front view of the lifting-platform. Fig. 5 is a detail section of the gathering-rake, taken through the line $y\,y$, Fig. 1, and showing the rake supported by a shoe. Fig. 6 is the same section as Fig. 5, but showing the rake supported by a caster-wheel. Fig. 7 is a detail cross-section of one of the rake and platform teeth.

Similar letters of reference indicate corresponding parts.

The object of this invention is to furnish an improved machine for stacking and ricking hay and straw, which shall be simple in construction, convenient in use, and effective in operation.

The invention consists in the combination of the sills and their braces, the uprights and their braces, the platform-bars, the platform, the truss-levers, the pulleys, and the ropes with each other, as hereinafter fully described.

A represents the side sills of the machine, the forward ends of which are attached to the front sill, B, at a little distance from its ends. C are the sill-braces, the rear ends of which are attached to the outer sides of the rear parts of the side sills, A, and their forward ends are attached to the ends of the front sill, B. To the side sills, A, a little in the rear of their centers, are attached the lower ends of the standards D, which incline slightly forward, and to their upper ends are attached the upper ends of the braces E. The lower ends of the braces E are attached to the forward parts of the side sills, A. The standards D are further strengthened by the braces F, the upper ends of which are attached to the outer sides of the upper parts of the said standards D. The lower ends of the braces F are attached to the outer parts of the arms G, the inner ends of which are attached to the middle parts of the side sills, A. To the outer ends of the arms G are attached loops or clevises H for convenience in fastening the machine to the ground.

To the middle parts of the standards D are pivoted the bars I, which have several holes formed through them to receive the pivoting-bolts to allow them to be adjusted as may be required. The forward ends of the bars I are attached to the ends of the cross-bars J of the platform, which is formed by attaching teeth K to the said cross-bars J. To the rear cross-bars of the platform J K is attached a ledge, L, to detain the hay upon the said platform until the proper time for its discharge. The platform J K L is strengthened by the truss-rod M, which passes beneath the middle teeth K, through the side teeth K, and through the bars I. To the ends of the truss-rod M are attached the ends of short ropes or chains N, the other ends of which are attached to the ends of the levers O. To the middle parts of the levers O, and at right angles therewith, are attached the ends of the short arms P, to the other ends of which are attached the inner ends of the braces Q. The outer ends of the braces Q are attached to the ends of the levers O. The truss-levers O P Q are pivoted at the outer ends of the short bars P to the upper ends of the standards D. To the other ends of the truss-levers O P Q are attached pulleys R, around which pass the ropes S, the rear ends of which are attached to the rear ends of the side sills, A.

From the pulleys R the ropes S pass around pulleys T in bearings secured to the lower parts of the standards D. From the pulleys T the ropes S pass to and around the pulleys U, pivoted to the front sill, B, at the forward ends of the side sills, A, and to their ends at one side of the machine is attached the singletree V, to which the horse is attached. With this construction, as the horse walks forward the platform J K L M will be raised, and the hay upon it will be deposited upon the stack or rick.

Upon the ropes S, at a little distance from their rear ends, are formed, or to them are attached, knots or rings S', to strike against the pulleys R and prevent the said ropes from passing through them any farther, so that the latter part of the movement of the platform may be more rapid.

The hay is gathered by a rake, which is formed by attaching teeth W to cross-bars X. The rear end of the central tooth projects the farthest in the rear of the cross-bars X, and the rear ends of the other teeth W gradually decrease in length toward the ends of the rake.

To the rear ends of the teeth W are attached continuous iron braces Y, the outer ends of which are attached to the end parts of the cross-bars X.

The rake W X Y is strengthened by the truss-rod Z, which passes beneath a bridge-block attached to the lower side of the central tooth W, and its ends are attached to the side teeth W. To the ends of the cross-bars X are attached the ropes or single-trees by which the rake is drawn.

To the lower side of the rear part of the rake are attached shoes A' or caster-wheels B', to diminish the friction upon the ground and give the rake a slightly-inclined position to cause it to gather the hay more readily.

When the rake has gathered a load it is drawn forward in such a position that the rake-teeth W may pass between and beneath the platform-teeth K, so that the said platform when raised may remove the hay from the rake and deposit it upon the stack or rick. The teeth K and W are made narrow and deep, have their lower edges rounded off, and their upper edges beveled into wedge shape, as shown in Fig. 7, to prevent them from interlocking with each other, and to cause the teeth W to pass more readily through tangled grass.

The platform J K L M is kept from dropping down too low by stops C', attached to the brace-bars E, and against which the platform-bars I strike.

Having thus described my invention, I claim as new and desire to secure by Letters Patent—

The combination of the sills A B and their braces, the uprights D and their braces, the platform-bars I, the platform J K L M, the truss-levers O P Q, the pulleys R T U, and the ropes S N with each other, substantially as herein shown and described.

BENJAMIN FRANKLIN JONES.

Witnesses:
T. M. RICE,
R. W. WHITLOW.